United States Patent [19]
Kendall

[11] Patent Number: 5,616,646
[45] Date of Patent: Apr. 1, 1997

[54] RESTRUCTURING SILICONE RUBBER TO PRODUCE FLUID OR GREASE

[75] Inventor: Steven S. Kendall, Howell, Mich.

[73] Assignee: Genesee Polymers Corporation, Flint, Mich.

[21] Appl. No.: 427,666

[22] Filed: Mar. 24, 1995

Related U.S. Application Data

[62] Division of Ser. No. 335,249, Nov. 7, 1994, abandoned.

[51] Int. Cl.$^6$ .................................................. C08L 83/00
[52] U.S. Cl. ........................... 524/588; 521/41; 521/41.5; 521/44.5; 521/47.5; 204/157.62; 204/157.63; 204/157.64; 524/501; 524/863; 252/321; 252/358
[58] Field of Search ........................ 521/41, 45.5, 41.5, 521/44.5, 47.5; 204/157.62, 157.63, 157.64; 524/501, 588, 863; 252/321, 358

[56] References Cited

U.S. PATENT DOCUMENTS

| | | | |
|---|---|---|---|
| 3,235,509 | 2/1968 | Nitzsche et al. | 252/358 |
| 3,383,327 | 5/1968 | Sullivan | 252/358 |
| 3,388,073 | 6/1968 | Domba | 252/321 |
| 3,453,234 | 7/1969 | Kookootsedes | 525/474 |
| 3,647,740 | 3/1972 | Loree et al. | 524/588 |
| 3,714,213 | 1/1973 | Miller et al. | 556/451 |
| 3,882,083 | 5/1975 | Berger et al. | 528/15 |
| 4,431,771 | 2/1984 | Falender et al. | 524/863 |
| 4,639,489 | 1/1987 | Aizana et al. | 524/588 |
| 4,741,861 | 5/1988 | Okada et al. | 252/358 |
| 4,762,640 | 8/1988 | Schiefer | 252/321 |
| 5,055,229 | 10/1991 | Pelton et al. | 252/321 |
| 5,110,972 | 5/1992 | Greenlee | 556/460 |
| 5,153,258 | 10/1992 | Nakahara et al. | 524/588 |
| 5,262,088 | 11/1993 | Hill et al. | 252/321 |

FOREIGN PATENT DOCUMENTS 1174219  12/1969  United Kingdom .

OTHER PUBLICATIONS

Crivello et al "Synthesis of cyclic Siloxanes by the Thermal Depolymerization of Linear Poly(siloxanes)".

*Primary Examiner*—Samuel A. Acquah
*Attorney, Agent, or Firm*—James C. McLaughlin

[57] ABSTRACT

The invention comprises processes for the production of useful fluid or grease from curable silicone compositions or silicone rubbers, preferably reclaimed or scrap silicone rubber. The processes involve the application of energy in such a manner that a un-curable silicone grease or liquid that contains essentially all of the original material is produced from curable silicone compositions and grease or liquid is produced from silicone rubbers. Suitable energy forms include thermal and mechanical. The fluid or grease produced by the processes are useful as raw materials for the manufacture of silicone products such as: antifoam compounds (defoamers), greases, conformal coatings or rubbers. The materials produced by these processes were unexpectedly found to have exceptional antifoam properties without requiring the addition of other materials or further processing. A second unexpected timing is that finely ground silicone rubber possesses antifoam properties and that grinding and extraction techniques can produce a silicone fluid with significant utility in foam suppression. Foam suppression is also achieved through the direct addition of ground silicone rubber to certain foaming systems. A process for controlling foam that involves adding silicone rubber that has been softened by ultrasonic means to a foaming system is also revealed.

8 Claims, No Drawings

RESTRUCTURING SILICONE RUBBER TO PRODUCE FLUID OR GREASE

This is a division of Ser. No.: 08/335,249 that was filed: Nov. 7, 1994 now abandoned.

TECHNICAL FIELD OF THE INVENTION

The technical field of the present invention is that of processes for the production of a useful fluid or grease from a curable silicone composition or silicone rubber, preferably reclaimed silicone rubber. More particularly, the technical field of the present invention relates to processes that entail (exclusively, or mostly) the application of energy to restructure silicone rubber. Additionally, the technical field of the present invention includes uses for the fluid or grease produced.

The fluid or grease produced is useful as a raw material for the manufacture of silicone products such as: antifoam compounds, greases, conformal coatings or rubbers. The material produced by this process was unexpectedly found to have exceptional antifoam properties without requiring the addition of other materials or further processing. A second unexpected finding is that finely ground silicone rubber possesses antifoam properties and that grinding and extraction techniques can produce a silicone fluid with significant utility in foam suppression. Foam suppression is also achieved through the direct addition of ground silicone rubber to certain foaming systems.

BACKGROUND INFORMATION

Definition of Terms

For use herein, it is necessary to define several categories of silicone compounds. The categories are: silicone fluids, silicone greases, silicone plastics, silicone rubbers, curable silicone compositions and silicone antifoam agents.

An ideal fluid will flow when subjected to any magnitude of shear stress. However, silicone fluids sometimes resist some level of shear stress before flow is initiated. Hereinafter, a fluid will be identified as a material that flows when subjected to a shear stress of 10 Pa or less at 25° C. A silicone fluid contains at least 90 percent diorganosiloxane.

Materials that will withstand significant shear stress without flowing will be categorized into two groups: greases and plastic solids. If a sufficient magnitude of shear stress is applied to these materials they will flow like a viscous liquid. The property of acting like a solid at low shear stress and like a liquid at some higher shear stress is called Bingham plasticity (see *ENGINEERING RHEOLOGY*, Clarendon Press, Oxford, 1985, pages 12 and 13 for a complete definition). The shear stress necessary to initiate flow will be referred to as the yield stress. Above the yield stress, an ideal Bingham plastic is expected to have a linear relationship between shearing stress and shear rate; here, a non-linear relationship between shearing stress and shear rate is also encompassed.

The distinction between a grease and a plastic solid is a subjective one. A general rule, and the one adopted herein, is that a grease is easily deformed by hand at 25° C. A plastic requires the force of a machine to cause flow at 25° C. The numeric values adopted reflect this distinction.

A grease is defined as a Bingham plastic that has a yield stress between 10 and 15,000 Pa at 25° C. A silicone grease is a material that contains at least 20 percent diorganosiloxane and exhibits the flow properties of a grease.

A plastic solid is defined as a Bingham plastic that has a yield stress greater than 15,000 Pa at 25° C. A silicone plastic is a material that contains at least 20 percent diorganosiloxane and exhibits the flow properties of a plastic solid.

Silicone rubber is another category of interest. A rubber is a solid material that deforms elastically (elastomeric solid) under low shear stress. After the stress is relieved the original shape is resumed. To be considered a rubber herein, a material must deform elastically when subjected to a strain of 1.1 inches/inch, or more, in tension. When a shear stress that is sufficient to cause permanent deformation is applied to a rubber at 25° C., it will fracture, rather than flow like a Bingham plastic. A silicone rubber is a rubber that contains at least 20 percent by weight of diorganosiloxane.

Curable silicone composition, as used herein, refers to a composition that contains at least 20 percent by weight of diorganosiloxane that can cure to form a rubber. The following steps shall be followed to determine if a particular silicone composition is curable: 1. place 50 grams of the composition in a glass 250 ml beaker, 2. heat the beaker and contents in a free convection oven at 200° C. for four hours, 3. remove the beaker and contents and allow to cool, uncovered, for 24 hours, 4. examine the contents of the beaker, if it fits the definition of a rubber contained herein it is curable.

The final category of silicone compounds to be defined is silicone antifoam agents, often called defoamers. A silicone antifoam agent is a material containing diorganosiloxane that is utilized in foam control. No distinction is made herein between the functions of breaking an existing foam and preventing the formation of foam.

One of the first silicone antifoam agents was initially formulated merely to serve as a grease. A purchaser of the grease found it to be an effective antifoam agent. Any silicone compound that has utility in suppressing foam is considered a silicone antifoam agent.

Prior to the present invention, it was thought that once a silicone compound was cured to the point of being a rubber then it would have lost the ability to serve as an antifoam agent. As will be shown, with careful control of processing conditions, silicone rubbers can be used to make silicone antifoam agents.

Foaming Systems' Background

Industrial applications that have the undesirable effect of producing foam are well known. Agitated aqueous systems such as waste water treatment operations and metal-working coolant recirculation systems are examples of industrial processes that produce undesirable foam.

The use of silicone antifoam agents to suppress foam in industrial applications is also well known. Silicone antifoam agents generally provide good foam suppression and a long effective life. In harsh environments, such as strongly acidic or basic foaming systems, the effective life of silicone antifoam agents is often greatly reduced. Examples of systems with harsh environments that have used silicone antifoam agents to provide foam control are deep well drilling operations that recirculate drilling mud and paper manufacturing that employs hot caustic systems to prepare paper pulp.

Antifoam Agents' Background

The use of various silicone containing compositions to control foam is well known. These materials are commonly referred to as silicone antifoam agents or defoamers. Typically, silicone antifoam agents are liquids that contain silicone fluid (usually diorganosiloxane), a filler (such as carbon black, silica or silicone resin), and some reactive silicone or organic compounds. In these formulations, various steps are taken to cause mechanical and chemical interaction between the raw materials used.

U.S. Pat. No. 5,153,258 teaches an antifoam composition containing an organopolysiloxane, a silica, and a cross-linked organopolysiloxane polymer exhibiting fluidity. This patent describes several elaborate techniques for making the cross-linked organopolysiloxane and for causing interaction between the materials.

U.S. Pat. No. 3,383,327 teaches a method of preparing an antifoam agent having improved stability against the silica settling out. The technique involves combining polydimethylsiloxane gum, silica, and a polydimethylsiloxane fluid under conditions of intense agitation and heat. In this patent, a gum is defined as a polydimethylsiloxane with a viscosity greater than 1,000,000 cSt. The temperature at which the antifoam agent is processed is specified to be greater than 100° C. and less than the temperature at which any of the materials will decompose.

Numerous other examples exist that employ similar materials and techniques. These silicone antifoam agents, in general, have excellent defoaming properties and an exceptionally long effective life. However, due to the cost of the raw materials used and the expense of the elaborate processes used to make the silicone antifoam agents, they are also quite expensive. It is an object of the present invention to have a simple process, using inexpensive raw materials, that produces silicone antifoam agents.

Silicone Rubber's Background

Typical processes for the manufacture of silicone rubber involve combining a filler (such as carbon black, silica, iron oxide or siloxane resin) with diorganosiloxane fluid, a cross-linking agent and sometimes a catalyst. It is common to employ high energy mixing equipment to achieve a uniform dispersion of the filler in the polymer. In many cases, the uncured silicone rubber is supplied as two components that must be blended before curing.

In U.S. Pat. No. 3,647,740 to Lorne A. Loree et al., a description of various methods of cross-linking (vulcanizing) silicone rubber is given. In Loree the term vulcanizing is used to describe the curing of a silicone rubber. The present invention is only concerned with the structure of cured silicone rubber (which may be the present invention's base material) and not the specific method of curing silicone rubber. Therefore, two groups are defined for silicone rubber cross-linking mechanisms. The first group, herein referred to as siloxane cured silicone rubber, contains silicone rubber that is cross-linked with siloxane bonds. These rubbers are characterized by cross-linking sites somewhere along the diorganosiloxane polymer that have a silicon atom bonded to three or four oxygen atoms. The second group, herein referred to as organic cured silicone rubber, contains silicone rubber that is cross-linked by organic radicals somewhere along the diorganosiloxane polymer. These rubbers are characterized by the existence of a single organic radical that attaches to two silicon atoms.

Both siloxane cured silicone rubber and organic cured silicone rubber are useful in the present invention. A rubber that is a combination of siloxane cured and organic cured silicone rubber is also useful in the present invention.

Waste Silicone Rubber Background

A large number of products are manufactured from silicone rubber. Waste silicone rubber is generated in the manufacturing of such products, as well as from the discarding of such products that have passed their useful life. Those familiar with applications of silicone rubber are well aware of the problem that the disposal of waste silicone rubber presents.

Silicone rubber is durable and thermally stable. Most silicone rubbers will withstand high temperature without significant degradation. This has caused difficulty in the reclamation of waste silicone rubber in the past.

Silicone rubber reclamation techniques have primarily fallen into two categories: de-polymerization into low molecular weight diorganosiloxane fractions and grinding to produce a filler to use in making new silicone rubber parts. These two types of reprocessing are discussed separately.

Reclamation of Silicone Rubber by De-polymerization

It is well known in the art that diorganosiloxane products, including rubber, can be converted into low molecular weight polymers of cyclic structure by a combination of thermal and catalytic action.

U.S. Pat. No. 3,989,733 to Okamotoa, et al., teaches a process for the preparation of cyclic diorganosiloxane by a complex distillation process, using a vertical packed catalysts zone. The process is run at a pot temperature in excess of 240° C.

U.S. Pat. No. 5,110,972 to Greenlee, teaches a process for dissolving silicone scrap in an appropriate solvent and chemically converting the scrap into dimethylsilicone cyclic trimer, tetramer, pentamer or the like by means of a two step acid/base catalyzed cracking process.

In both Okamotoa and Greenlee, the liquid silicone material reclaimed from silicone rubber is of low molecular weight and must be re-polymerized to form silicone fluids of useful viscosity. Additionally, any filler that was contained in the scrap silicone starting material is separated from the silicone fluid by these processes. In other words, the processing effort that was originally invested in polymerizing the diorganosiloxane fluid and in causing bonding between the filler and polymer is lost in these reclamation techniques.

A technology exists that was developed to reclaim organic rubber by ultrasonic de-vulcanization. U.S. Pat. No. 5,258,413 and related patent U.S. Pat. No. 5,284,625 to Isayev, describe a device and process for de-vulcanization of rubber in a pressurized reactor. Isayev contends that the process breaks S—S, S—C, and, if desired, C—C bonds. No conclusive evidence is offered to support the process being selective in bond breaking. In Isayev, it is evident that "de-vulcanization" refers to the softening of a cured rubber. The de-vulcanized rubber produced by the ultrasonic process is described as a thermoplastic material that can be reused in new rubber molding operations. Isayev tests the organic rubber that was de-vulcanized, by using a Mooney Viscometer. The results of those tests are presented on graphs that are labeled as viscosity versus shear rate.

From an examination of the operation of the Mooney Viscometer, it becomes apparent that the materials being described by Isayev are nether liquids nor greases. ASTM D 1646 (available from ASTM; 1916 Race Street; Philadelphia, Pa.) describes a procedure for using the Mooney Viscometer. The test specimens are prepared by compression-molding thermoplastic material into sheets under a pressure of 250 psi ($1.7 \cdot 10^6$ Pa), as described in Isayev. The sheets then must be cut into a shape that fits the Mooney Viscometer. Next the cut sheets must be placed into the Viscometer and clamped under extreme force so that the rubber flows around the rotor, after which the measurements can be made. It is clear that it requires great force to deform the material being tested by the Mooney Viscometer in these examples. This force is much greater than the hand force that is sufficient to deform grease as herein defined.

In ASTM D 1646, it is stated that the Mooney viscosity is not a true viscosity, but a measure of shearing torque over a range of shearing stresses. The magnitudes of the Mooney viscosity numbers and molding pressures for the test specimens in Isayev indicate that the so called de-vulcanized rubber fits the current category of plastic solid.

In the specifications, Isayev invites experimentation of the use of the ultrasonic process for processing silicone rubber. No examples are offered that demonstrate performance when silicone rubber is processed. It is believed that Isayev extrapolates results, when processing silicone rubber, that are similar to those obtained when organic rubber was processed, because only organic rubber is tested. There is no evidence that Isayev anticipated that ultrasonic processing of silicone rubber would yield a grease or liquid, such as is produced by the present invention. All examples contained in Isayev yield materials that fit the current category of plastic solid.

Experimental evidence in Isayev supports ultrasonic processing at temperatures up to 200° C. Processing temperatures of up to 300° C. are claimed. In the present invention, it is demonstrated that silicone rubber may be "de-vulcanized" at temperatures between 200° and 300° C. without ultrasonic vibration. Isayev teaches, in column 3 line 8 of U.S. Pat. No. 5,284,625, that "It is well known that vulcanized elastomers having a three-dimensional chemical network, cannot flow under the effect of heat and/or pressure." If Isayev's extrapolation from organic to silicone rubber is accepted, this quote teaches that the present invention will not work. That is, the extrapolation would suggest that silicone rubber will not flow when subjected to pressure and temperature in the range of 200° to 300° C.

The present invention offers examples where silicone rubber processed in the temperature range of 200° to 300° C. yields fluid, without the use of ultrasonic vibration. It is obvious that the use of an ultrasonic device, while following the process of the present invention, is not necessary for the production of a liquid or grease from a silicone rubber. Such a use of ultrasonic vibration would constitute a form of mechanical energy that could be used in accordance with the present invention.

There is no indication that Isayev anticipated the possibility of any silicone rubber processed in the ultrasonic device having foam suppression properties. However, the technology of the current invention makes it apparent that silicone rubber that has been processed with ultrasonic processes may have utility in antifoam applications.

Reclamation of Silicone Rubber by Grinding

The finding that the liquid or grease produced by the present invention had superior antifoam properties prompted careful examination of ground silicone rubber. This examination lead to another unexpected finding: that antifoam agents could be derived directly from ground silicone rubber.

The process of grinding waste silicone rubber and using the resultant as a filler for new silicone rubber parts is familiar to those skilled in the art. In some instances, processes have been developed to optimize the use of ground rubber as a filler. Such is the case in U.S. Pat. No. 4,006,207 to Yeshin, which teaches a method of lowering the density of ground silicone rubber and using it as a filler in the remanufacture of silicone rubber. In this and other recasting processes, the potential for use of the reclaimed silicone rubber is limited.

The present invention encompasses a process that allows the extraction of a fluid that has significant antifoam properties directly from ground silicone rubber. In some applications, it was found that ground silicone rubber may be applied directly to suppress foam.

Restructured Silicone Rubber as an Antifoam

No reference has been found on the topic of the reclamation of silicone rubber that suggests that silicone rubber may possess the potential for suppressing foam. Even in references that describe processes and compositions for the manufacture of silicone antifoam compounds, there is no indication that, once cured, there is a potential for silicone rubber to provide antifoam utility. Some references were found that use curable silicone compositions (as herein defined) as components in antifoam applications. However, in each of these, care is taken to disperse or emulsify the silicone system prior to curing in order to avoid system wide cross-linking that could lead to the formation of a solid rubber. U.S. Pat. No. 5,262,088 to Hill et al. and U.S. Pat. No. 4,935,464 to Ona et al. detail methods of producing such emulsions. In these patents, a curable silicone composition was used as a component in the antifoam agent. If water were to be evaporated from these emulsions they might form a rubber or be a curable silicone composition. That is, if a dehydrated version of these emulsions were subjected to the test for a curable silicone composition contained herein, they would possibly be classified as curable. No suggestion to remove water exists and the emulsions as used would not fit the present category of curable silicone composition.

In U.S. Pat. No. 5,153,258 to Nakahara et al., a careful distinction is made between silicone compounds with a sufficiently high cross-link density to be a rubber and those that are of a lower cross-link density, which are suitable for use in Nakahara's disclosed antifoam. A component in the Nakahara composition might fit the present category of curable silicone composition, but the complete formulation would not.

The prior art has failed to recognize that a limited degradation of silicone rubber can cause a restructuring of the cross-linking polymers to the extent that a fluid or a grease is obtained. Further, there is no indication that prior art anticipated that the materials produced during any process involving cured silicone rubber could yield materials that are useful in antifoam applications.

In silicone antifoam formulations containing a filler (such as silica, siloxane resin, and carbon black), elaborate techniques are employed to cause chemical and mechanical association of the diorganosiloxane fluid and the filler. As the filler is separated from the fluid, the effectiveness of the antifoam is diminished. It is believed that the optimum antifoam particle would have extremely durable bonding between the fluid and filler. It is difficult to cause such durable bonding without causing the entire antifoam agent to gel. As is seen by the references above, the prior art in antifoam formulating has utilized elaborate steps to cause durable bonding between the filler and silicone fluid used, without cross-linking the system as a whole. These techniques are similar to those found in many silicone rubber formulations. When the entire system begins to cross-link, as occurs during the curing of silicone rubber, the ability of the antifoam to spread in the foaming system is inhibited, and performance is diminished. Prior art has failed to offer a technique for the restructuring of silicone rubber into a liquid or grease without destroying the diorganosiloxane polymer in the rubber. Thus, no possibility for the use of silicone rubber in antifoam applications has previously been recognized.

THEORY

One objective of the present invention is a process for the careful application of thermal or mechanical energy (or a combination of the two) to a silicone rubber to effect the limited degradation of the rubber so that it is restructured into a liquid or grease. The preferred embodiment of the present invention uses thermal and mechanical energy to restructure a silicone rubber into a liquid or a grease.

The theory of the present invention offered herein is intended as an explanation only, it is not to be construed to limit the invention in any way. It is theorized that the diorganosiloxane polymers that provide the system wide cross-linking in a silicone rubber are constantly under a significant strain. This strain restricts the mobility of the entire system and forms the rubber. It is believed that, when subjected to conditions that are just sufficient to begin the degradation of the diorganosiloxane polymer contained in the rubber, those polymers with the greatest strain break much faster than do the bulk of the polymers. The observed effect of silicone rubber processed according to the present invention has been that the rubber is restructured, depending on how completely the cross-linking polymers have been broken, into a liquid or grease that contains essentially all of the materials originally in the rubber.

It was originally thought that the liquid or grease produced by the process of the present invention could only be used in applications that use ordinary silicone fluids, such as antifoam agents, greases, silicone rubbers and conformal coatings. It was an unexpected finding that some silicone rubber that has been restructured according to the present invention has exceptional antifoam characteristics without further processing. In some instances, the performance of the antifoam agent produced by the present invention was superior to many of the best commercially available products, which have been made using expensive additives and processes.

It is demonstrated by the references above that the processes and materials used to make most silicone rubbers are similar to those commonly used to make antifoam agents and greases. The primary difference between the three is the degree of system wide cross-linking present in the particular material. The fact that rubber processed by the present invention has significant antifoam characteristics is seen as an indication that, primarily, the cross-linking polymers have been broken and the other polymers have been unaffected. It is believed that the cross-linking structure that remains in the fluid or grease produced by the present invention is similar to those obtained by the complicated and expensive processes used in the manufacture of many antifoam agents. Nevertheless, the antifoam agents produced in accordance with the present invention were found, in some cases, to provide foam suppression superior to those made by other processes.

When silicone rubber is made, a durable bond is created between the diorganosiloxane polymer and the filler. This is indicated by the toughness and thermal stability of the rubber. When silicone rubber is processed by the present invention, the cross-linking polymers are believed to be broken while the polymers that are bound to the filler are unaffected. Thus a particle is liberated that has the durable polymer/filler bonding of a rubber and the spreading necessary to suppress foam.

Silicone rubber that does not contain filler can be restructured by the method of the current invention. While the resulting grease or liquid may not have good foam suppression properties, its utility in other applications remains.

It will be obvious to one skilled in the art that the method of the present invention can be used to prevent the formation of rubber when a composition that would otherwise cure to a rubber is processed. That is, the formation of cross-linked sites that occurs during the curing of a silicone rubber can be offset by the breaking of the cross-linking polymer by the method of the present invention. The result of this breaking of the cross-linking polymers during the curing process is the formation of the durable bonds between filler and fluid, that was described above, while maintaining the spreading of an uncured antifoam agent. The material thus produced has utility similar to the material produced from cured rubber.

Another objective of the present invention is a method of preventing the formation of a rubber from a curable silicone composition in a manner that provides a fluid or grease with superior foam suppression properties. This objective is preferably accomplished by heating the curable silicone composition with agitation to a temperature that is near the breakdown temperature of the diorganosiloxane polymer. This is seen as a combination of the process of curing a curable silicone composition to form a rubber, and then restructuring that rubber by the method described above. Because the curing and breakdown of the rubber can happen at nearly, if not exactly, the same time, is not practical to determine if a rubber existed for a short period or not. It is therefore difficult to determine if the method of limited degradation of cross-linking polymers, that is an object of the present invention, was used. Materials that fit the definition of curable silicone compositions as used herein are also suitable for use in the current invention. These curable silicone compositions will cure to form cross-linking polymers that can be broken or restructured by the methods of the present invention.

In the event, discussed above, where the emulsions of Hill and Ona are dehydrated to form (possibly) curable silicone compositions, the technical wisdom of the past predicts that such dehydrated emulsions' utility as antifoam agents would be lost. No processes known prior to the present invention provide restructuring of cured or curable silicone compositions to form a liquid or grease that has utility in foam control.

The advancement of the art offered by the present invention is two fold: 1. Recognizing that silicone rubber contains the durable bonding between polymer and filler that is desired for antifoam agents. 2. Providing processes for the restructuring of silicone rubber or curable silicone compositions into a fluid or grease that has utility in many applications, including foam suppression.

ENERGY FORMS

Energy forms that have been tested thus far for use in the current invention are thermal and mechanical. It is expected that other energy forms, such as electromagnetic radiation, can be applied in a manner to effect the restructuring of silicone rubber or curable silicone compositions to produce a liquid or grease, in accordance with the current invention.

The application of mechanical energy to break the cross-linking polymers of a silicone rubber is the easiest to understand. When sufficient force is applied to a rubber it tears. As the tear progresses, stress is concentrated at the tear point. This affect, called stress concentration, is well known to those skilled in mechanical engineering and material sciences. The force on the cross-linking polymers at the tear point is sufficient to cause them to fracture. This stress concentration directs the force, primarily, to the cross-linking polymers while very little force is applied to non-cross-linking polymers. Immediately after the polymers fracture, the energy that was stored in the deformation of those polymers that were fractured and the surrounding cross-linking polymers is dissipated into thermal energy. If the temperature of the rubber in an extremely small region around the fracture could be instantly measured it would be expected to be quite high. However, this thermal energy is quickly dissipated and the average temperature of the rubber does not raise significantly.

The effect of the application of thermal energy is also quite easy to understand. As stated above, when the thermal degradation temperature of the diorganosiloxane polymers contained in the rubber is approached, those polymers that form the cross-linking network are fractured more quickly than the bulk of the polymers. This is due to the pre-existing strain in the cross-linking polymers that confines the system into its rubber state. The source of the thermal energy is not limited. Conduction, convection, friction, ultrasonic vibration, and electromagnetic radiation are recognized as sources of energy that can generate the temperature necessary to cause restructuring according to the current invention. Thermal, mechanical or a combination of the two are suitable energy sources for use in accordance with the current invention.

While the theories presented herein have not been proven beyond a doubt, it has been shown that superior antifoam agents have been produced from silicone rubber and from curable silicone compositions, without incorporating additives or requiring further processing. It is common for additives, such as spreading agents, to improve the performance of a basic silicone antifoam. It is expected that by optimizing the process of the present invention, and incorporating the appropriate additives, the performance of antifoam agents produced by this method will be greatly enhanced.

UTILITY OF THE PRODUCTS PRODUCED

The commercial value of this invention is enormous. In use today are numerous products made of silicone rubber. Things such as caulking compounds, molded auto parts, printing pads and baby bottle nipples are made of silicone rubber. In the process of molding silicone rubber parts there exists a significant quantity of waste material. When a silicone rubber part is removed from the mold, the excess rubber contained in flash and injection ports must be trimmed and discarded. Because of the present invention, it should become desirable to institute waste recycling programs for silicone rubber. All of this waste material can provide an inexpensive source of raw material for use with the present invention.

The preferred use of the fluid or grease produced by the process of the present invention has thus far been found to be as a component in antifoam compounds. The cost of producing an antifoam compound by this process is exceptionally low. So low, that even if the antifoam properties of products made by the present invention were inferior to the products currently on the market (which is not the case) these products could be sold at a low enough price to cause them to be a viable product. In fact, the antifoam compounds made by the present invention are not inferior to those currently on the market. To the contrary, in many comparative experiments it was found that products made by the present invention were superior to other antifoam compounds that currently enjoy good economic performance in the marketplace.

Similar cost savings may be obtained when the materials produced by the present invention are used in applications that use ordinary silicone fluid or grease. It is expected that the properties of the finished product may be enhanced when this material is used as part of the formulation for greases, rubbers and conformal coatings.

SUMMARY OF THE INVENTION

This invention comprises processes for the production of useful fluid or grease from curable silicone compositions or silicone rubber, preferably reclaimed silicone rubber. The processes involve the application of energy in such a manner that a silicone grease or liquid that contains essentially all of the original material is produced. Suitable energy forms are mechanical, thermal and a combination of mechanical and thermal.

In the preferred embodiment, a silicone rubber is heated with agitation to a temperature approaching the degradation point of the diorganosiloxane polymers of the rubber. The process is continued until the silicone rubber is restructured into a fluid or grease. The temperature and duration of processing are specific to the rubber being processed and some experimentation will assist in the optimization of the process. Many of the products produced were unexpectedly found to have exceptional antifoam properties.

A second unexpected finding was that a liquid can be extracted from some silicone rubbers that have been ground into fine pieces. This liquid was found to have significant antifoam properties. Additionally, it is shown that the addition of ground silicone rubber directly to a foaming system can provide foam suppression.

A process for controlling foam that involves adding silicone rubber that has been softened by ultrasonic means to a foaming system is also revealed.

DETAILED DESCRIPTION OF THE INVENTION AND ITS PREFERRED EMBODIMENT

In the present invention, mechanical energy, thermal energy, or a combination of mechanical and thermal energy, is applied to silicone rubber, preferable reclaimed silicone rubber, in a manner that produces a liquid or grease. Additionally, curable silicone compositions may be heated to a temperature in excess of 200° C. with agitation to produce a liquid or grease that is not curable. Any applications that use ordinary silicone fluid or grease may benefit from the use of the material produced by the present invention. These applications include the manufacture of antifoam agents, rubber, grease and conformal coatings.

It was found that when the silicone fluid or grease produced by the present invention was used in antifoam applications a significant performance advantage over products currently on the market could be obtained. Example 13 gives the results of performance testing of Dow Silicone Antifoam Compound A. Example 10 gives the results of performance testing of a fluid produced according to the present invention. As can be seen, the product of the present invention (example 10) had a faster foam reduction rate and better persistence than Dow Compound A.

Silicone rubber suitable for use in the present invention can be described as an elastomeric solid that contains at least 20 percent by weight of diorganosiloxane and that fractures when subjected to a shear stress sufficient to cause permanent deformation at 25° C. Curable silicone compositions suitable for use in the present invention are identified as any composition that contains at least 20 percent by weight of diorganosiloxane that can cure to form a rubber. The following steps shall be followed to determine if a particular silicone composition is curable: 1. place 50 grams of the composition in a glass 250 ml beaker, 2. heat the beaker and contents in a free convection oven at 200° C. for four hours, 3. remove the beaker and contents and allow to cool, uncovered, for 24 hours, 4. examine the contents of the beaker, if it fits the definition of a silicone rubber contained herein then it is curable.

Application of Thermal Energy

The preferred method of applying energy to a curable silicone composition or silicone rubber in accordance with the present invention is to heat it, with agitation, to a temperature sufficient to break the cross-linking structure without affecting the bulk of the silicone polymer contained in the rubber. The exact temperature necessary to achieve this is dependent on the type of curable silicone composition or silicone rubber, degree of cross-linking, and any residual catalysts present, among other factors. Typical temperatures are between 230° and 380° C.

Another technique for producing a fluid from a curable silicone composition or silicone rubber according to the present invention is to heat it until a slow evolution of low molecular weight silicone cyclic materials is observed. The evolution of silicone cyclic materials indicates that the temperature is at the threshold of polymer degradation. The best temperature to process the particular material being evaluated will be near this temperature. If it is desired to produce silicone cyclic materials while processing, the temperature can be increased. If the particular material is shown to degrade quickly then a reduced temperature may be selected.

An evolution of silicone cyclic materials was not observed during all tests of the present invention. Such evolution is not necessary when operating in accordance with the present invention.

If the process of heating the curable silicone composition or silicone rubber is continued for too long or if the temperature is too high, excessive loss of the diorganosiloxane to volatile cyclic materials may occur. In this extreme case, the remaining material would not be a liquid or grease, as it is required to be in accordance with the present invention. In some applications it may be advantageous to produce a limited quantity of silicone cyclic materials. If desired, the process can be controlled to produce both silicone cyclic material and the fluid or grease of the present invention.

If the temperature is carefully controlled, and the duration of heating is correct, the degradation of the rubber forming structure will occur without adversely effecting the bulk of the polymers. The resulting material is then a fluid or grease that contains essentially all of the materials originally in the curable silicone composition or silicone rubber.

The greatest utility of the present invention is found when silicone rubber, ether alone or with other materials, is liquified by the application of heat and agitation in a controlled manner. This technique was evaluated using several types of silicone rubber, which are listed in Table 1. These include both siloxane and organic cured silicone rubber as well as some whose composition is unknown.

Examples 1 and 2 give specific details of how a simple device, when operated carefully, can yield satisfactory results. In these examples, a test tube containing the rubber and some dimethyl silicone fluid is heated over a flame until essentially all of the rubber has been converted into a fluid. The silicone fluid used in these examples provided heat transfer that was needed because there was no mixing.

In example 1 the silicone rubber contained silica as a filler. After it was liquified, the silica remained suspended in the fluid. This supports the concept that the rubber that has been converted to a fluid may actually consist of microscopic particles of rubber.

In examples 3, 4, and 6 various organic and siloxane cured rubbers were heated in the presence of dimethyl silicone fluid. The device used required the use of dimethyl silicone fluid to aid in mixing. In example 3 the rubber was not completely liquified; further processing may have completed the liquefaction process. In examples 4 and 6 the rubber was liquified to a great degree. In each of these examples the resulting liquid was viscous and possessed antifoam properties.

Example 5 exemplifies the importance of the proper temperature and duration in processing silicone rubber according to the present invention. When the temperature was deliberately increased, the liquefaction process was a failure.

The preferred embodiment of this invention is found in examples 9, 10 11 and 14. Example 10 shows the most-preferred embodiment of the present invention. In these examples, the rubber is thoroughly liquified by the use of moderate agitation and high temperature. The device used allowed moderately precise control of the temperature and provided even mixing of the rubber. In each of these examples, the material produced had exceptional antifoam characteristics.

Examples 10, 11 and 14 are of particular interest because the rubber was liquified without the addition of any other material. These examples give conclusive evidence that liquified silicone rubber can provide a superior antifoam agent without the addition of other materials or further processing.

Example 12 demonstrates how the present invention can be used to produce a grease. In this example, silica was added as a filler and the processing conditions were modified. The material produced flowed easily when worked by hand and held its position when formed into low stress shapes. The product also was found to possess good antifoam properties. The use of silica in addition to silicone rubber did not interfere with the restructuring process of the current invention. It is expected that the presence of other fillers commonly used in antifoam formulations would have little effect on the restructuring of a silicone rubber in the processes of this invention.

Example 14 demonstrates the utility of the present invention when processing a curable silicone composition. The original material cured when subjected to the test conditions for a curable silicone compound. Although insufficient material was produced by this example to conduct the curable silicone compound test, the material produced did not cure when subjected to similar conditions. It is also demonstrated that the material produced in this example had significant foam suppression properties.

It was shown in examples 1 and 2 that a dimethyl silicone fluid could be present during the restructuring process. These examples show that the presence of a fluid that is capable of withstanding the processing temperature does not prevent the restructuring of the silicone rubber. In these examples the dimethyl silicone fluid aided in processing. Likewise, example 12 demonstrates that the addition of a filler to the rubber during the restructuring process did not inhibit the effect of producing a grease. In example 15, a silicone rubber was combined with 100 cSt dimethyl siloxane fluid and amine-functional silicone fluid prior to processing. The amine-functional silicone fluid was added as a spreading agent to improve foam knock down. The amine-functional silicone fluid used in this example contains a tin catalyst. In example 16, a conventional antifoam agent (containing dimethyl silicone fluid, silica, an amine functional silicone fluid and tin catalyst) and an amine-functional silicone fluid were combined with a silicone rubber prior to processing. The resulting product was a thick liquid that had good defoaming properties. It can be seen that the presence of these materials did not interfere with the process of restructuring the rubber into a liquid.

The presence of other materials that do not adversely affect the restructuring process is allowable according to the present invention. In particular, materials commonly used in the formulation of silicone antifoam agents, silicone greases and silicone rubbers may be combined with the silicone rubber during processing. These materials include: diorganosiloxane polymers, siloxane resins, silica, iron oxide, carbon black, spreading agents, catalysts, silicone antifoam agents, silicone greases and any other materials that do not interfere with the restructuring of the silicone rubber to form a liquid or grease. Although the processes of these examples were conducted at ambient pressure, increased or decreased pressure may be employed. It is expected that one skilled in the art would use differing pressure conditions to improve the processes of the current invention where appropriate.

Application of Mechanical Energy

It was unexpectedly found that when silicone rubber was ground into small particles, and these particles were placed in a foaming system, that foam suppression was achieved. The first experiment (experiment I) that demonstrated this involved placing a blind-end 2 inch (50.8 mm) inside diameter pipe in the chuck of a lathe, filling the pipe with chunks of rubber B and running the lathe at 450 rpm while forcing a non-rotating 1⅞ inch (47.625 mm) solid rod into the rubber filled pipe. The rubber was ground into small pieces and forced out through the gap between the static rod and rotating pipe. The pieces were about ⅛ inch (3 mm) along their long dimension and were irregularly shaped. They were hot to the touch and felt sticky. After handling the rubber pieces an oily film could be felt on the fingers.

A head of foam was created by hand shaking a 1% solution of Triton X-100 in water in a wide-mouth 8 oz (0.24 l) jar. When one of the pieces of the ground rubber was placed into the head of foam, the foam broke immediately around the piece. It was observed that the foam continued to break in a spherical pattern advancing away from the rubber piece for a considerable distance. It is suspected that the process of grinding the silicone rubber liberated ether a fluid or small particles and that which was liberated was responsible for the observed foam breaking.

A second experiment (experiment II) was conducted in an attempt to extract the suspected fluid from ground rubber and concentrate it for evaluation. In this experiment, rubber B was ground by pressing it through an 0.008 inch (0.203 mm) gap under pressure supplied by a hand pumped 12 ton (107,000 newtons) hydraulic jack. Rubber pieces that were approximately ⅛ inch (3 mm) along their long dimension, and of irregular shape, were produced with no detectable heat generation.

Extraction was performed by placing 3 g of this finely ground rubber in an 8 oz (0.24 l) wide-mouth jar with some glass marbles and 148 g of heptane. The jar and contents were placed in a commercial paint shaker and agitated for 10 minutes. After agitation, the contents of the jar were poured through a course filter to yield 43 g of liquid.

The liquid recovered was observed to contain some extremely fine particulate. A sample of the liquid was placed in an aluminum weighing dish and was heated in a 105° C. oven for one hour. The non-volatile residue was determined to be 15.8% of the mass of the original liquid. This residue was observed to be a viscous fluid that contained small particulate. When tested according to procedure 01, the residue showed moderate foam knock down and fair persistence.

It is known that rubber B is formulated with a portion of unreactive dimethyl silicone fluid to provide its elastic properties. This unreactive dimethyl silicone fluid may have been simply extracted from the silicone rubber by the action of the solvent in the above example. However, when tested alone, this unreactive dimethyl silicone fluid does not possess any antifoam properties.

Experiments I and II indicate that the process of grinding silicone rubber does liberate a fluid with utility as an antifoam agent and possibly for other applications. This investigation leads one skilled in the art to expect that employing grinding devices of sufficient efficiency would produce a significant portion of fluid that could be extracted from silicone rubber.

In certain cases, where the desired use of the fluid produced by the grinding of silicone rubber is in foam suppression, it may be unnecessary to separate the fluid from the ground rubber. The action of the foaming system may liberate the antifoam agent from the rubber over an extended period of time. In some foaming systems a slow antifoam release may be advantageous.

Because ground silicone rubber possess antifoam characteristics, it is obvious that its use as a component in antifoam formulations could enhance the performance of the antifoam agent thus produced. The possibility of using silicone rubber as a filler in antifoam applications was investigated. A simple antifoam agent formula, consisting of only silicone rubber and diorganosiloxane fluid was chosen for testing. In examples 7 and 8, a silicone rubber was ground in the presence of a dimethyl siloxane fluid. Although the intensity of agitation was high enough to produce relatively high temperatures, the rubber particles that were produced were not small enough to stay dispersed. Some antifoam characteristics did develop in example 7. It is expected that for some rubbers the use of equipment capable of reducing the particle size of the rubber further would provide enhanced antifoam properties.

It will be obvious to one skilled in the art that using grinding equipment, having sufficient efficiency, would result in a dispersion of silicone rubber in a silicone fluid that would be analogous to a silica dispersion in silicone fluid that is commonly used in antifoam compounds. It is anticipated that additives and processing techniques known to enhance performance in conventional silicone antifoam agents would also enhance the performance of antifoam agents produced according to the present invention from ground silicone rubber.

It has been shown that both mechanical and thermal energy can effect the restructuring of a silicone rubber in accordance with the current invention. As is seen in example 10, the preferred embodiment of the current invention utilizes a combination of mechanical and thermal energy.

The preferred embodiment and alternate embodiments of the present invention have been described in detail. The embodiments described are illustrative and not restrictive.

TABLE 1

| RUBBER ID | Cure type | Description |
|---|---|---|
| A | Siloxane | Dow Corning Silicone Sealant. Acetic acid cure room temperature vulcanizing (RTV) silicone rubber calk, cured for several weeks at 38° C. Contains silica filler. |
| B | Siloxane | Print pad rubber, condensation cure two component. |
| C | Siloxane | ECCOSIL 4952-LEW (Vionon CSUP, Silicone Cured Dust; Comp No. 4952LEW. Contains aluminum oxide and iron oxide fillers. |
| D | Unknown | Silicone baby bottle nipple, Gerber |
| E | Siloxane | GP-134 amine functional (Genesee Polymers Corp.). Contains no filler. |
| F | Unknown | Silicone Rubber Compound EHH-950-027-1 (Wacker Silicones Corporation). Contains silica filler. |

PERFORMANCE TESTS

Antifoam Performance Test Procedure 01

Fill an 8 oz (0.24 l) wide-mouth jar with approximately 4 oz of 1% Triton X-100 Surfactant (Union Carbide Chemical Co., product code PC-89521, Danbury, Conn.) in water. Apply the lid and shake the jar 30 times by hand to develop a foam head. Open the jar and add one drop of the antifoam of interest. Observe the foam knock down performance and record the performance as good, fair, poor or none. Replace the lid and shake the jar 30 additional times. Observe the foam level and break rate and record persistence as good, fair, poor or none.

Antifoam Performance Test Procedure 02

Weigh 100 grams ±1 gram of 1% Triton X-100 into an 8 oz (0.24 l) wide-mouth jar. Weigh 0.05 ±0.001 grams of defoamer onto the center of the jar lid using an analytical balance. Make a mark on the jar at the liquid level and 5 mm above the liquid level as the jar sits undisturbed. Fit the jar into a paint shaker with a sample jar adapter (custom made). Shake the sample and jar in the paint shaker for four minutes. Start a stop watch as the shaker is turned on. At four minutes, stop the shaker and allow the stop watch to continue running. Quickly remove the jar and place it on a flat surface. Stop the timing when the foam level falls to the earlier made upper mark on the jar. Record defoam time as the stopwatch time less 4 minutes.

EXAMPLES

Example 1

Approximately equal parts of silicone rubber A and dimethyl silicone fluid were placed in a pyrex test tube and heated to boiling over a propane flame. No temperature measurements were made.

The rubber restructured to a great degree and a hazy liquid was produced. Some evolution of silicone cyclic materials was observed. When tested according to antifoam test procedure 01, good knock down and fair persistence were observed.

Example 2

The process of example 1 was repeated using rubber D. The rubber restructured completely producing a slightly hazy liquid. Some evolution of silicone cyclic materials was observed. When tested according to antifoam test procedure 01, fair knock down and fair persistence were observed.

Example 3

A device was constructed that consisted of a 1½ inch (38.1 mm) thick circular disk welded to the bottom of a 3 inch (76.2 mm) steel pipe. This device was placed on a electric hot plate and a mixer was inserted. A thermocouple wire was placed inside the heating cylinder to measure the temperature of the liquid.

400 g of 100 cSt dimethyl silicone fluid and 100 g of rubber B was placed in the apparatus described above. The mixer was started and the hot plate was set on high. The product was heated and held between 287° and 310° C. for one hour.

In the resulting product, it was noted that the rubber did not restructure completely. There were small chunks of rubber within the fluid. The liquid material was tested according to procedure 01 and given fair knock down and persistence ratings.

Example 4

To the apparatus of example 3, 100 g of rubber C and 150 g of 100 cSt dimethyl silicone fluid was added. The mixture was heated to 376° C. for 3½ hours. The resulting product was a red liquid, essentially the same color as the rubber used. When tested according to procedure 01, the product exhibited good knock down and good persistence.

Example 5

To the apparatus of example 3, 90 g of rubber B and 200 g of 100 cSt dimethyl silicone fluid was added. The mixture was heated to 405° C. for 4 hours. The resulting product was a brown spongy rubber. When tested according to procedure 01, the product exhibited essentially no defoaming properties.

Example 6

To the apparatus of example 3, 150 g of rubber F and 250 g of 100 cSt dimethyl silicone fluid was added. The mixture was heated to 379° C. for 2 hours. The resulting product was a black liquid With some unrestructured rubber. When tested according to procedure 01, the product exhibited fair knock down properties.

Example 7

A custom built, high-shear mixer was constructed. The mixer consisted of a 3 inch (76.2 mm) diameter rotor turning inside a stationary stator. Both rotor and stator had passages to allow centrifugal pumping of fluid through the mixer. The gap between the rotor and stator was approximately 0.015 inches (0.38 mm) on each side. The rotor speed was 3600 rpm. The mixer was installed inside a steel housing of approximately 2 gallons (7.57 l) capacity.

To the above apparatus, 8 lbs (3.623 kg) of 350 cSt dimethyl silicone fluid and 2 lbs (907 g) of rubber B were added. The mixer was run 2¼ hours and an internal temperature of 167° C. was achieved due to mixing.

The resulting product was a hazy liquid with small pieces of rubber dispersed. When tested according to procedure 02, slow defoaming was observed.

Example 8

To the apparatus of example 7, 8 lbs (3.623 kg) of 350 cSt dimethyl fluid and 2 lbs (907 g) of rubber A were added. The mixer was run approximately 4 hours and the contents achieved a temperature of approximately 204° C. When tested according to procedure 01, no defoaming properties were detected.

Example 9

A rotating mill consisting of a stainless steel cylinder of approximately 5 gallon (18.9 l) capacity oriented at an incline of approximately 15° from horizontal was constructed. One end of the cylinder is open to allow gases to escape and to provide access to the thermocouples used for temperature measurement and control. The mill is contained in a natural gas fired oven. Temperature is controlled by an adjustable, thermocouple-type controller. The mill rotates at approximately 60 rpm. Approximately one gallon (3.8 l) of glass marbles are used in the mill to aid in agitation.

5 lbs (2.27 kg) of rubber B and 5 lbs (2.27 kg) of 100 cSt dimethyl silicone fluid were combined in the above described mill. The batch was heated with agitation and held at a temperature between 240° C. and 279° C. for one hour and was then allowed to cool.

All of the rubber was completely liquified. When tested according to procedure 01, good knock down and good persistence were observed.

When tested according to procedure 02, the product gave uniform defoaming, and cleared all the bubbles off the surface of the liquid. The product took 69 seconds to reduce the bubbles to the 5 millimeter line.

Example 10

800 g of rubber A and 1 gallon (3.785 l) of glass marbles were added to the device of example 9. The batch was held at a temperature of 335° to 346° C. for 2 hours. The resulting product was a thick brown liquid with a viscosity of 168,800 cP. The product was tested according to antifoam test procedure 02. Four, four minute agitation periods were run on the same foam test sample with the following results: The first 4 min. agitation took 36 s to defoam. The second 4 min. agitation (8 min total) took 54 s to defoam. The third 4 min. agitation (12 min. total) took 61 s to defoam. The fourth 4 min. agitation (16 min. total) took 86 s to defoam.

Example 11

2 lbs (907 g) of rubber B and 1 gallon (3.785 l) of glass marbles were added to the device of example 9. The contents were heated to 315° C. for two hours. The resulting product was a dark grey liquid with a viscosity of 1700 cP. The sample was tested according to antifoam test procedure 02 with a result of 81.69 s.

Example 12

1000 g of rubber B and 200 g of silica were added with 1 gallon (3.785 l) of glass marbles to the device of example 9. The batch was heated with agitation to 310°–313° C. for 30 minutes. The result was a sticky grease that was easily formed by hand.

A cylinder of approximately 2.65 inches (67.3 mm) in diameter and 4.34 inches (110.2 mm) high was formed and observed for slump. After 1 hour, no slump was observed. When tested according to antifoam test procedure 02, a time of 134 s was obtained.

Example 13

Dow Corning Antifoam Compound A (Food Grade) was tested according to antifoam test procedure 02. Three, four minute agitation periods were run on the same sample with the following results: The first 4 min. agitation took 80 s to defoam. The second 4 min. agitation (8 min total) took 102 s to defoam. The third 4 min. agitation (12 min. total) took 187 s to defoam.

Example 14

100 g of Dow Corning Silicone Sealant, 100 g of 350 cSt dimethyl silicone fluid and 3 g of water were blended. 50 grams of the blend was placed in a 250 ml glass beaker. The beaker and contents were placed in an oven at 200° C. for 4 hours and then removed from the oven and allowed to stand for 24 hours. The contents of the beaker was evaluated at the end of the 24 hour standing period and found to be an extremely elastic rubber.

A sample of the uncured mixture was placed in a test tube and carefully heated over an open flame. Significant gas evolution was observed and a strong acetic acid smell was noted. The flame was intermittently applied to the test tube and removed to control boiling. Intermittent stirring with a stainless steel rod was administered. After cooling, the contents were examined and it was found that the processed blend had been restructured to yield a thick liquid. The liquid was tested according to antifoam performance test procedure 01 and poor knock down and fair persistence were observed.

Both the processed and unprocessed blend were tested to determine if they were curable; 2 g of each material was placed in separate aluminum dishes. Both dishes and their contents were placed in an oven at 200° C. for 4 hours then removed and allowed to stand for 24 hours. The contents of both aluminum dishes were examined; the sample of the liquid made by processing the blend remained a liquid and the sample of the unprocessed blend had formed a soft rubber.

Example 15

3268 g of rubber B, 290.5 g of 100 cSt dimethyl silicone fluid, 72.64 g of amine functional-dimethyl silicone fluid and 1 gallon (3.785 l) of glass marbles were added to the device of example 9. The batch was held at a temperature of 260° to 315° C. for 1 hour. The resulting product was a thick bluish colored liquid. When tested according to antifoam performance test 02, a time of 55 s was recorded.

Example 16

5 lbs (2.27 kg) of silicone antifoam compound 94F16-H1, 5 lbs (2.27 kg) of rubber B, 1 lb (454 g) of amine-functional silicone fluid and 1 gallon (3.785 l) of glass marbles were added to the device of example 9. The batch was held at a temperature of 260° to 315° C. for 1¼ hours. The resulting product was a thick bluish colored liquid. When tested according to antifoam performance test 01, good knock down and good persistence were noted.

I claim:

1. The process of suppressing foam using silicone rubber comprising the steps of applying sufficient energy to the silicone rubber until at least some of the silicone rubber has been converted to a grease, wherein the energy is thermal, mechanical, or thermal and mechanical; and adding said grease to a foaming system, whereby foam suppression is achieved.

2. The process of suppressing foam using silicone rubber that comprises the steps of:
   grinding the rubber;
   separating a fluid from the resultant; and
   adding said fluid to a foaming system, whereby foam suppression is achieved.

3. The process of suppressing foam using silicone rubber that comprises the steps of heating silicone rubber in combination with materials that do not interfere with the restructuring of the silicone rubber to form a fluid or grease selected from the group consisting of diorganosiloxane fluid, silica, carbon black, iron oxide, siloxane resin, silicone antifoam agents, silicone grease, spreading agents, diorganosiloxane polymers, siloxane resins, and catalysts, to a temperature in excess of 200° C., until at least some of said silicone rubber has been converted into a fluid or grease; and adding the resultant fluid or grease to a foaming system, whereby foam suppression is achieved.

4. The process of suppressing foam using silicone rubber that comprises the steps of heating silicone rubber in combination with materials that do not interfere with the restructuring of the silicone rubber to form a fluid or grease selected from the group consisting of diorganosiloxane fluid, silica, carbon black, iron oxide, siloxane resin, silicone antifoam agents, silicone grease, spreading agents, diorganosiloxane polymers, siloxane resins, and catalysts, to a temperature in excess of 200° C., until at least some of said silicone rubber has been converted into a fluid or grease; agitating said combination during said heating step; and adding the resultant fluid or grease to a foaming system, whereby foam suppression is achieved.

5. The process of suppressing foam using silicone rubber that comprises the steps of heating silicone rubber to a temperature in excess of 200° C., until at least some of said silicone rubber has been converted into a fluid or grease; agitating said silicone rubber during said heating step; and adding the resultant fluid or grease to a foaming system, whereby foam suppression is achieved.

6. The process of suppressing foam using silicone rubber that comprises the steps of heating silicone rubber to a temperature in excess of 200° C., until at least some of said silicone rubber has been converted into a fluid or grease; combining said rubber with a dimethylsiloxane fluid prior to said heating step; and adding the resultant fluid or grease to a foaming system, whereby foam suppression is achieved.

7. The process of suppressing foam using silicone rubber that comprises the steps of heating silicone rubber to a temperature in excess of 200° C., until at least some of said silicone rubber has been converted into a fluid or grease; combining said rubber with silica prior to said heating step; and adding the resultant fluid or grease to a foaming system, whereby foam suppression is achieved.

8. The process of suppressing foam using silicone rubber comprising the steps of:
   de-vulcanizing a silicone rubber through the use of ultrasonic vibration in the frequency range of 10 kHz to 1 MHz;
   heating said de-vulcanized rubber to a temperature of greater than 200° C. until at least some of said de-vulcanized rubber has been converted to a grease with a yield stress of less than 10,000 Pa; and
   adding the grease to a foaming system, whereby foam suppression is achieved.

* * * * *